United States Patent
Dong et al.

(10) Patent No.: US 7,277,491 B2
(45) Date of Patent: Oct. 2, 2007

(54) DATA ACCESS ARRANGEMENT USING A HIGH FREQUENCY TRANSFORMER FOR ELECTRICAL ISOLATION

(75) Inventors: Ping Dong, Cupertino, CA (US); Jordan C. Cookman, San Jose, CA (US)

(73) Assignee: ESS Technology, Inc., Fremont, CA (US)

( * ) Notice: Subject to any disclaimer, the term of this patent is extended or adjusted under 35 U.S.C. 154(b) by 0 days.

(21) Appl. No.: 10/146,200

(22) Filed: May 14, 2002

(65) Prior Publication Data

US 2003/0215020 A1    Nov. 20, 2003

(51) Int. Cl.
*H04B 3/00* (2006.01)
*H04L 25/00* (2006.01)

(52) U.S. Cl. .................. 375/258; 375/260; 375/288

(58) Field of Classification Search ............ 375/220, 375/222, 257, 258, 295, 259, 367, 256, 239, 375/221, 252, 247; 370/509, 441, 320, 342, 370/515, 506, 337; 455/76, 102, 427, 504, 455/506, 522; 342/27, 21, 22; 714/776; 327/103
See application file for complete search history.

(56) References Cited

U.S. PATENT DOCUMENTS

| | | | |
|---|---|---|---|
| 3,690,313 A * | 9/1972 | Weppner et al. | |
| 3,798,608 A * | 3/1974 | Huebner | 340/172.5 |
| 4,326,287 A * | 4/1982 | Abramson | 370/29 |
| 4,417,099 A | 11/1983 | Pierce | |
| 4,740,963 A * | 4/1988 | Eckley | 370/522 |
| 4,912,723 A | 3/1990 | Verbanets | |
| 5,123,012 A | 6/1992 | Suzuki et al. | |
| 5,224,154 A | 6/1993 | Aldridge et al. | |
| 5,280,526 A | 1/1994 | Laturell | |
| 5,315,651 A | 5/1994 | Rahamim et al. | |
| 5,329,439 A * | 7/1994 | Borojevic et al. | 363/87 |
| 5,369,666 A | 11/1994 | Folwell et al. | |
| 5,369,687 A | 11/1994 | Farkas | |
| RE35,104 E | 11/1995 | Murakami et al. | |
| 5,506,891 A | 4/1996 | Brown | |
| 5,528,685 A | 6/1996 | Cwynar et al. | |

(Continued)

OTHER PUBLICATIONS

Jantzi et al "A Fourth-Order Bandpass Sigma-Delta Modulator", IEEE, Journal of Solid State circuits, vol. 3, Mar. 1993.*

(Continued)

*Primary Examiner*—M. Ghayour
*Assistant Examiner*—Qutub Ghulamali
(74) *Attorney, Agent, or Firm*—Kenta Suzue; Haynes Beffel & Wolfeld LLP

(57) ABSTRACT

An electrical isolation barrier for use in a Data Access Arrangement uses a high frequency (HF) transformer 24 to provide isolation. An input signal, which may be analog or digital, is connected to a modulator. The analog output of the modulator is connected to the input of the HF transformer. The output of the HF transformer is connected to the input of a demodulator. Simple amplitude modulation can be used in the modulator to modulate the input signal to the frequency range of operation of the HF transformer. A simple low pass filter may be incorporated in the demodulator to remove harmonic distortion caused by the HF transformer. The output signal of the demodulator is substantially the same as input signal.

53 Claims, 9 Drawing Sheets

U.S. PATENT DOCUMENTS

| | | | |
|---|---|---|---|
| 5,555,293 A | 9/1996 | Krause | |
| 5,574,404 A | 11/1996 | Le Bars | |
| 5,640,433 A | 6/1997 | Szczbak et al. | |
| 5,654,984 A | 8/1997 | Hershbarger et al. | |
| 5,655,010 A | 8/1997 | Bingel | |
| 5,675,640 A | 10/1997 | Tappert et al. | |
| 5,712,977 A | 1/1998 | Glad et al. | |
| 5,774,541 A | 6/1998 | Krause | |
| 5,859,557 A | 1/1999 | Schley-May | |
| 5,867,560 A | 2/1999 | Frankland | |
| 5,870,046 A | 2/1999 | Scott et al. | |
| 5,875,235 A | 2/1999 | Mohajeri | |
| 5,901,210 A | 5/1999 | Schley-May | |
| 5,946,393 A | 8/1999 | Holcombe | |
| 5,946,394 A | 8/1999 | Gambuzza | |
| 5,952,956 A * | 9/1999 | Fullerton | 342/27 |
| 5,995,534 A * | 11/1999 | Fullerton et al. | 375/146 |
| 6,005,923 A | 12/1999 | Lee | |
| 6,021,158 A | 2/2000 | Schurr et al. | |
| 6,061,445 A | 5/2000 | Rahamim et al. | |
| 6,081,586 A | 6/2000 | Rahamim et al. | |
| 6,088,446 A | 7/2000 | Huang | |
| 6,104,230 A | 8/2000 | Jarcy | |
| 6,104,794 A | 8/2000 | Hein et al. | |
| 6,107,948 A | 8/2000 | Scott et al. | |
| 6,128,373 A | 10/2000 | Mathé et al. | |
| 6,137,827 A | 10/2000 | Scott et al. | |
| 6,141,414 A | 10/2000 | Mathé et al. | |
| 6,144,326 A | 11/2000 | Krone et al. | |
| 6,160,885 A | 12/2000 | Scott et al. | |
| 6,167,132 A | 12/2000 | Krone et al. | |
| 6,167,134 A | 12/2000 | Scott et al. | |
| 6,169,762 B1 | 1/2001 | Embree et al. | |
| 6,169,792 B1 | 1/2001 | Schley-May | |
| 6,169,801 B1 | 1/2001 | Levasseur et al. | |
| 6,191,717 B1 | 2/2001 | Scott et al. | |
| 6,198,816 B1 | 3/2001 | Hein et al. | |
| 6,201,865 B1 | 3/2001 | Dupuis et al. | |
| 6,205,218 B1 | 3/2001 | Fischer et al. | |
| 6,212,226 B1 | 4/2001 | Newton | |
| 6,222,922 B1 | 4/2001 | Scott et al. | |
| 6,225,927 B1 | 5/2001 | Scott et al. | |
| 6,226,331 B1 | 5/2001 | Gambuzza | |
| 6,289,070 B1 | 9/2001 | Krone et al. | |
| 6,297,755 B2 | 10/2001 | Scott et al. | |
| 6,298,133 B1 | 10/2001 | Hein et al. | |
| 6,304,597 B1 | 10/2001 | Dupuis et al. | |
| 6,307,891 B1 | 10/2001 | Hein et al. | |
| 6,351,530 B1 | 2/2002 | Rahamim et al. | |
| 6,359,973 B1 | 3/2002 | Rahamim et al. | |
| 6,385,235 B1 * | 5/2002 | Scott et al. | 375/220 |
| 6,658,051 B1 * | 12/2003 | Liu | 375/222 |
| 7,010,286 B2 * | 3/2006 | Sorrells et al. | 455/313 |
| 2001/0001013 A1 | 5/2001 | Scott et al. | |
| 2001/0028320 A1 | 10/2001 | Prendergast et al. | |
| 2001/0033653 A1 | 10/2001 | Fischer et al. | |
| 2004/0057511 A1 * | 3/2004 | Liu | 375/222 |

OTHER PUBLICATIONS

Schreier, Richard, "An Empirical Study of High-Order Single-Bit Delta-Sigma Modulators", IEEE, Transaction on Circuits and Systems, vol. 40, No. 8, Aug. 1993.*

PCT International Search Report mailed on Dec. 10, 2003 corresponding to PCT/US03/14949 filed on May 12, 2003.

PCT Written Opinion mailed on Mar. 17, 2004 corresponding to PCT/US03/14949 filed on May 12, 2003.

* cited by examiner

DATA ACCESS ARRANGEMENT USING A HIGH FREQUENCY TRANSFORMER FOR ELECTRICAL ISOLATION

BACKGROUND OF THE INVENTION

The invention relates to isolation barriers for selectively isolating electrical circuits from each other. Such isolation barriers find use in modems and other devices, particularly those that require electrical isolation barriers between the devices and the public telephone network.

The Federal Communications Commission Part 68 has mandated that electrical connections to the public telephone network provide an isolation barrier between circuitry directly connected to that network (called the "line side" circuitry) and circuitry, such as a modem, that is directly connected to residential power (called the "system side" circuitry.) This isolation barrier must provide isolation such that a large magnitude voltage source of one thousand volts or fifteen hundred volts at 50 Hz or 60 Hz rms applied between various points on the device causes no more than 10 milliamperes leakage current.

The theory of isolation barriers is well known in the prior art. For example, U.S. Pat. No. 6,137,827 describes the theory and background of isolation barriers in great detail, incorporating by reference many patents illustrating isolation barriers and the devices that use them. Typically, electrical isolation is provided in the Data Access Arrangement (DAA) of the device. U.S. Pat. No. 6,137,827 and the patents incorporated therein by reference are each also incorporated herein by reference.

A conventional modem uses a voice band transformer in its DAA to provide The electrical isolation barrier. The transformer carries both the transmit signal and the receive signal. The separation of these two signals is done using a hybrid circuit of a type used to couple four-wire to two-wire circuits. Hybrid circuits are well known in the art and have four sets of terminals arranged in two pairs designed to produce high loss between two sets of terminals of a pair when the terminals of the other pair are suitably terminated. A modem using a voice band transformer DAA is known for its high reliability. However, the voice band transformer must handle low frequency (LF) signals from around 100-4000 Hz.

The primary source of distortion in a transformer is non-linearity, which causes signal harmonics. For voice band signals, many of these harmonics fall within this same 100-4000 Hz band. Signal harmonics are characterized by unwanted energy at multiples of the desired signal frequencies. So, the signal frequency component at 500 Hz will cause noise at 1000 Hz, 1500 Hz, 2000 Hz, 2500 Hz, 3000 Hz, 3500 Hz, and 4000 Hz; all within the desired signal band. On the other hand, if the signal is modulated to a high frequency, say 1 Mhz, then the desired signal will be in the range of 0.996 MHz to 1.004 MHz. Now, the 500 Hz component is at 0.9995 Mhz and 1.0005 Mhz. The lowest harmonic is at 1.999 MHz, well above the highest signal frequency of 1.004 MHz. Therefore, a simple low-pass filter can be used to remove the harmonics, and no distortion will be caused in the desired signal. The linearity of the transformer is largely dependent on the magnetic inductance density in its magnetic core. The higher the magnetic inductance density, the less linear the transformer and the higher the energy of the signal harmonics. Therefore, a high linearity requirement is placed on the voice band transformer, which generally increases its size and cost.

In addition, a modem DAA using a voice band transformer typically uses a direct driver approach. In this approach, the transmitted signal from the modem driver proceeds through the transformer directly without further amplification. This direct driver approach requires the transformer to deliver high transmit power, further increasing the linearity requirement of the transformer. Because of these drawbacks a satisfactory voice band transformer for this type of electrical isolation is bulky and expensive.

There are several approaches to solve this problem. One approach is to use digital transformers or pulse transformers to replace the voice band transformer. However, a digital or pulse transformer is binary and therefore cannot carry two signals, the transmit signal and the receive signal, simultaneously. To allow both the transmit signal and the receive signal to be transmitted acceptably, one has to either use two pulse transformers, one for the transmit signal and the other for the receive signal, or resort to some sort of time division multiplexing method to carry the transmit signal and the receive signal alternately. However, this time division multiplexing method will destroy the self-clock ability of the signal. Therefore the clock signal has to be carried by a different means, typically using another transformer and adding further expense to the product. Another disadvantage of digital or pulse transformers is that they must be operated in their saturation range, requiring more power than similar transformers operated in their non-saturated (or "linear") range.

Another approach is to use capacitive coupling. This approach uses one or more high voltage capacitors as The electrical isolation barriers because a capacitor typically exhibits good linearity. Therefore, separation of the transmit signal and the receive signal using a hybrid circuit is possible. On the other hand, a LF voice band signal, required in modems, requires a large capacitor. Such a high voltage large capacitor is expensive. Therefore, some means are used to modulate the signal to a higher frequency to reduce the capacitor requirement.

Yet another approach is to use high voltage optical couplers. Again, due to the typically highly non-linear property of this type of optical device, separate couplers must be used for the transmit signal and the receive signal. In a DAA using optical coupling as The electrical isolation barrier, one can use a base band approach, or pass band approach. In the base band approach, the voice band signal is transmitted directly through the optical couplers. However, this has the drawback of requiring an elegant method to compensate for the non-linearity of the optical couplers. In the pass band approach, some means are used to modulate the signal to a higher frequency to reduce the impact of the non-linearity of the optical couplers, adding additional cost and complexity to the solution.

In addition to the transmit and receive voice band signals that modems of the type under discussion must transmit, there are control and status signals that also need to pass through The electrical isolation barrier. These latter signals are either carried through a separate isolation barrier, or multiplexed with the voice band signal and carried over the same isolation barrier.

SUMMARY OF THE INVENTION

We have observed that the linearity of a transformer largely depends on the magnetic inductance density in its magnetic core. The magnetic inductance density is directly proportional to the power delivered by the transformer, while inversely proportional to the volume of magnetic core, the number of turns of the transformer, and the frequency of the signal. In other words: the smaller the signal power, the larger the magnetic core, the more the coil turns, and the higher the signal frequency, the more linear the transformer. Or to achieve the same linearity, smaller signal power and higher frequency will result in a smaller magnetic core with fewer coil turns, leading to a smaller and less expensive transformer.

The current invention uses two approaches to achieve a low cost, reliable electrical isolation barrier using a single high frequency (HF) transformer. First, we can add an amplifier at the line side of The electrical isolation barrier to reduce the power requirement of the transformer.

Second, we use some means to modulate the signals to a higher frequency. At a higher frequency, any harmonics resulting from the transformer non-linearity are out of band. Simple means can then be used to remove any remaining distortion from the transformer non-linearity.

Unlike the digital or pulse transformer, the HF transformer is not driven to its saturation range. Therefore, less power is required to operate the invention than is required by conventional isolation means using digital or pulse transformers. Also, by operating the HF transformer in its linear range, it is possible for the transmit and receive signals to be carried simultaneously by a single transformer, with HF hybrid circuits to separate the two directions.

BRIEF DESCRIPTION OF THE DRAWINGS

The present invention can be better understood with reference to the drawings that are intended to illustrate only examples of embodiments of the invention and are not to be considered to limit the scope of the invention. The invention may well admit of equally effective additional embodiments without departing from its scope.

DESCRIPTION OF PREFERRED EMBODIMENTS

Figure 1:
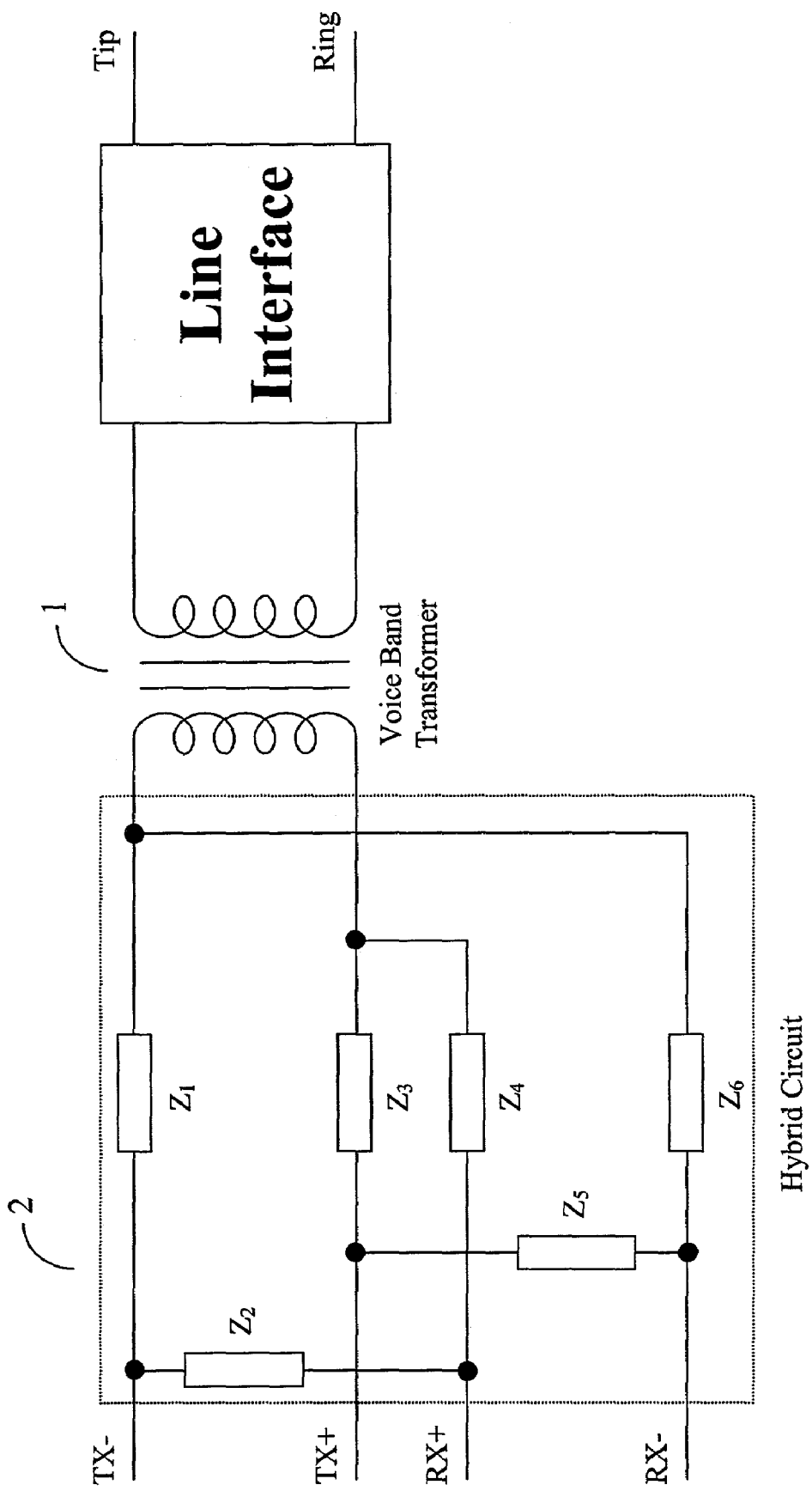
FIG. 1 illustrates a prior art voice band transformer based DAA circuit, including hybrid circuits for converting a four-wire circuit to a two-wire circuit.

FIG. 1 illustrates a prior art isolation barrier for use in a DAA. In that figure, a modem uses a voice band transformer 1 in its DAA to provide The electrical isolation barrier. The transformer carries both the transmit signal and the receive signal. The separation of these two signals is done using a hybrid circuit 2 of a type used to couple four-wire to two-wire circuits. Hybrid circuits are well known in the art and have four sets of terminals arranged in two pairs designed to produce high loss between two sets of terminals of a pair when the terminals of the other pair are suitably terminated. The hybrid circuit illustrated in FIG. 1 contains six impedance elements Z1-Z6, which are typically realized using resistors, capacitors, or some combination thereof. Other hybrid circuit configurations are also possible in a conventional transformer DAA.

Figure 2:
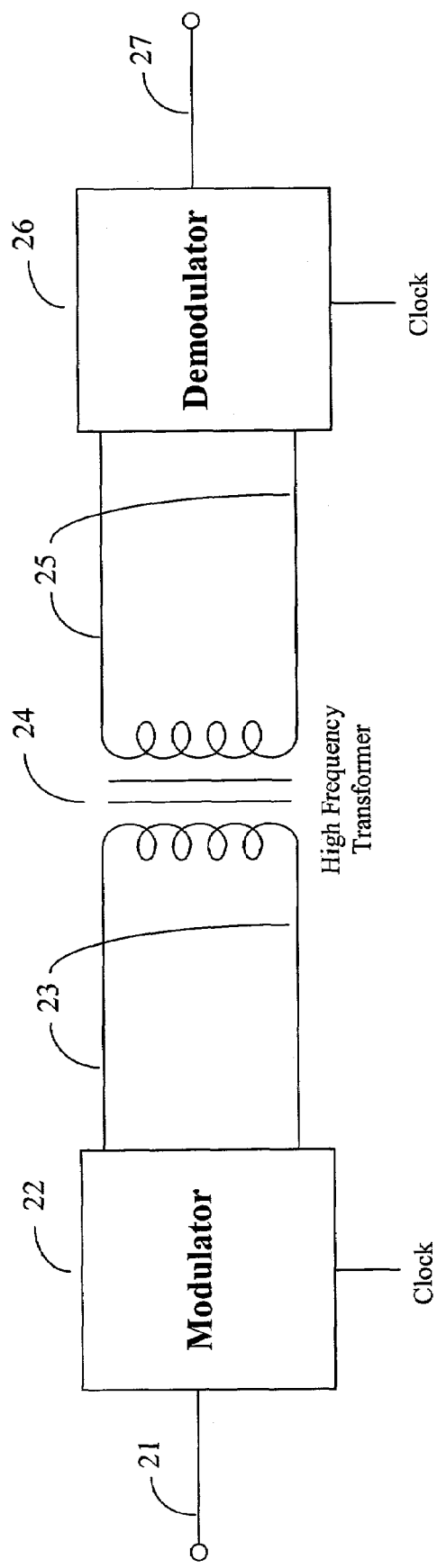
FIG. 2 illustrates a block diagram of a DAA isolation barrier using an HF transformer according to the teachings of this invention.
Figure 8:
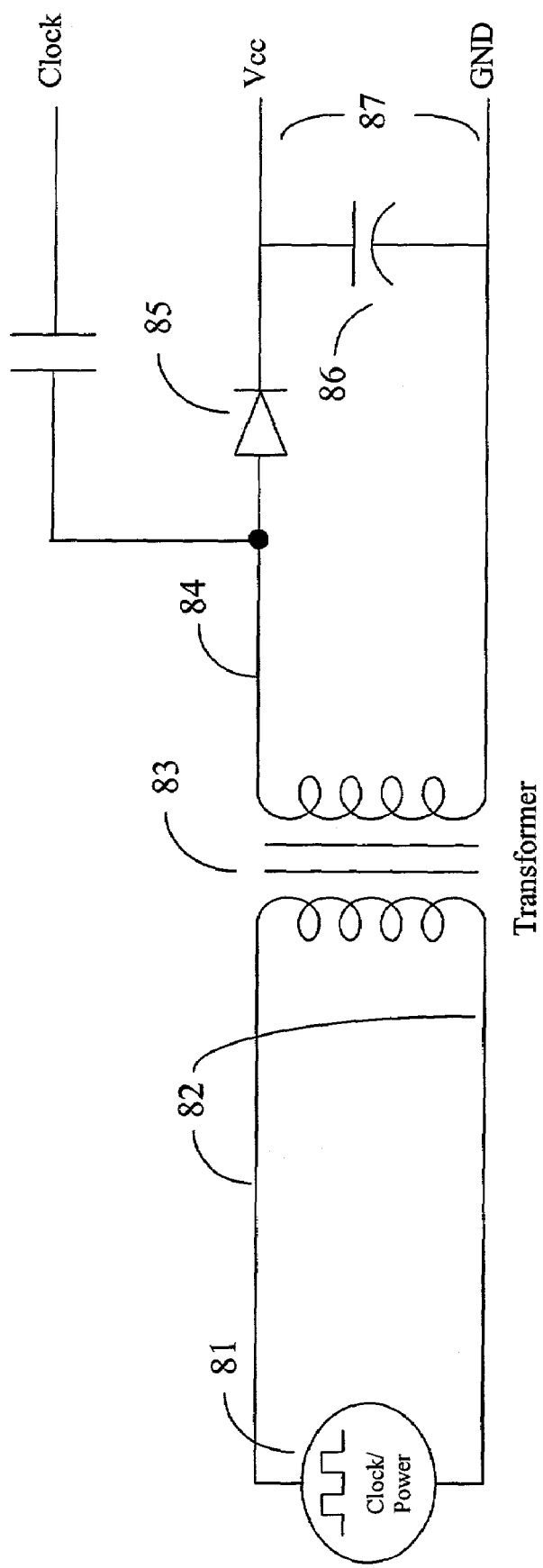
FIG. 8 illustrates an example circuit for delivering power from the system side circuit to the line side circuit.

FIG. 2 illustrates our basic invention. In that figure, an HF transformer 24 provides isolation. An input signal 21, which may be analog or digital, is connected to modulator 22. The analog output of modulator 22 is connected via lines 23 to the input of HF transformer 24. The output of HF transformer 24 is connected to the input of demodulator 26 via lines 25. The demodulator 26 generates an output signal 27, which may be analog or digital. No matter whether the input or output signals are digital or analog, the signal presented to the HF transformer 24 is analog in all embodiments of our invention. Simple amplitude modulation can be used in modulator 22 to modulate the input signal 21. This can be done by multiplying the input signal 21 by a clock signal. Similarly, the demodulator 26 may use a clock signal to multiply the signal from the HF transformer 24. The clock used by the demodulator 26 may be derived from the signal, or may be provided across a separate isolation barrier, as illustrated in FIG. 8. A simple low pass filter may be incorporated in the demodulator 26 to remove harmonic distortion caused by the HF transformer 24. The output signal 27 is substantially the same as input signal 21.

Figure 3:
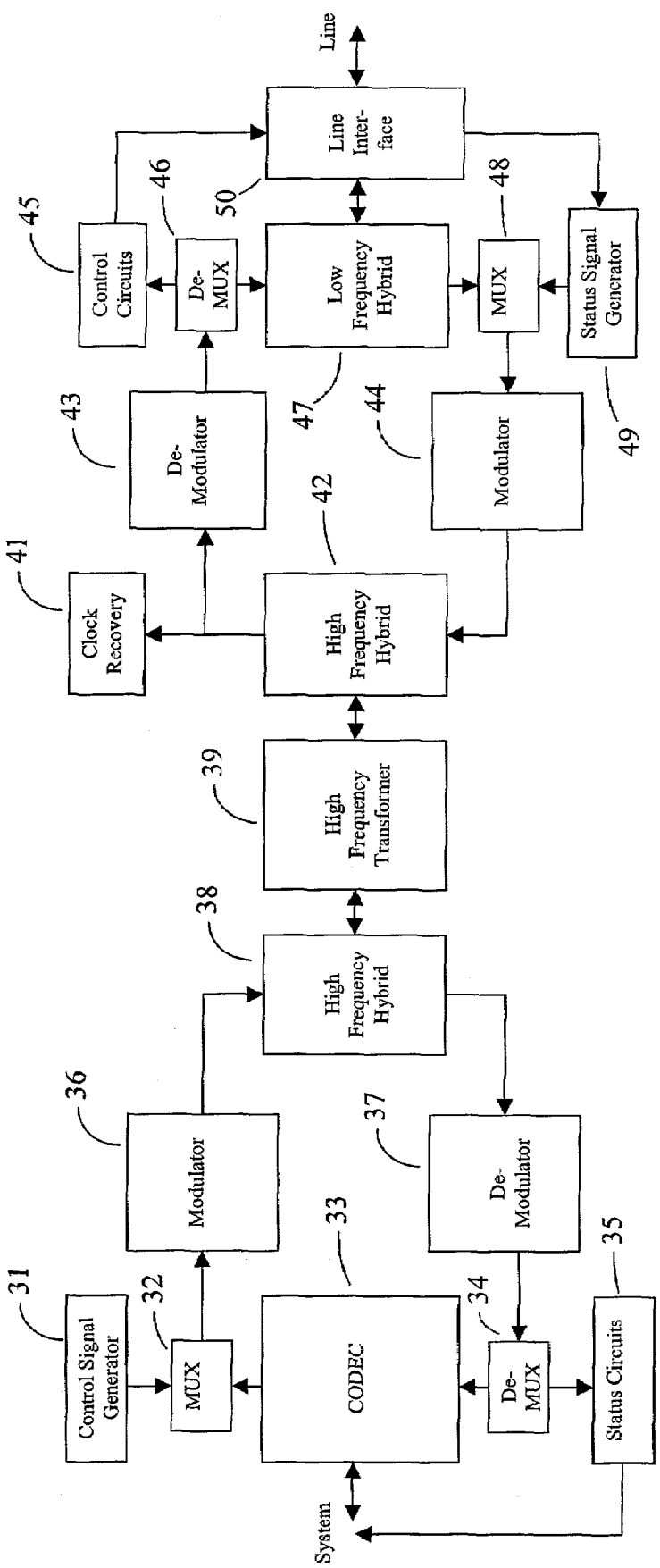
FIG. 3 illustrates a DM using a single HF transformer isolation barrier and hybrid circuits to convert four-wire circuits to two-wire circuits, where the CODEC is located entirely in the system side circuitry.
Figure 4:
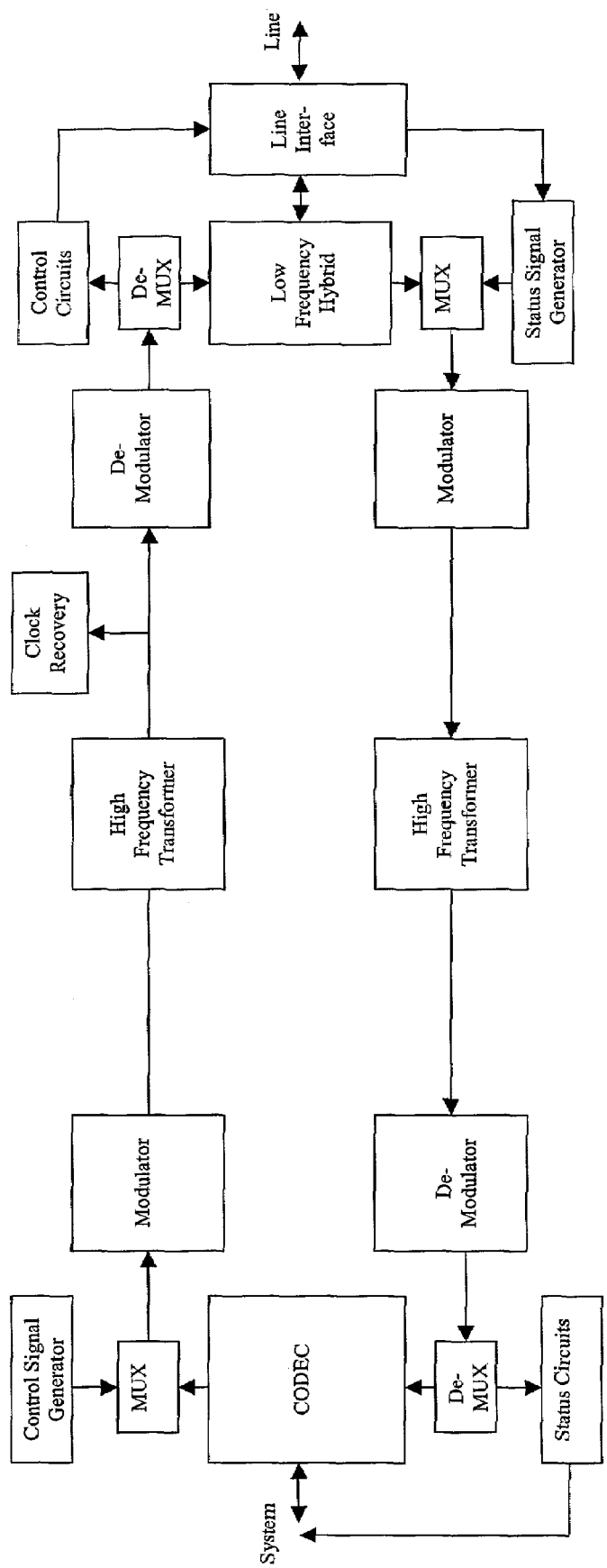
FIG. 4 illustrates a DAA using two HF transformer isolation barriers, one for TX and one for RX, where the CODEC is located entirely in the system side circuitry.

FIGS. 3 and 4 illustrate the use of the invention in a DAA application where the system-side circuitry contains the CODEC. First, the TX signal path in FIG. 3 will be described. Modem signals to be transmitted on the line are sent in digital form from the modem system to CODEC 33, which converts them to analog form and sends them to MUX 32. The Control Signal Generator 31 sends control signals in analog form to MUX 32. MUX 32 combines the two analog signals into one "base band" signal. In a preferred embodiment, the two signals are separated in frequency, and can be combined by a straightforward summing circuit. The combined signal is sent to the Modulator 36, which shifts the combined signal to a higher frequency, resulting in a "pass band" signal. The pass band signal enters the High Frequency Hybrid 38, which interfaces both the pass band TX and pass band RX signals to the High Frequency Transformer 39. On the line side of the transformer, the pass band TX signal passes through a second High Frequency Hybrid 42. The pass band TX signal is then sent to both the Clock Recovery 41, and the Demodulator 43. The Clock Recovery 41 locks the frequency of the line-side Demodulator 43 to that of the system-side Modulator 36. The Demodulator 43 shifts the frequency of the signal back to the original base band. This line-side base band signal is sent to the De-MUX 46, which separates the control signals from the TX line signal. In a preferred embodiment, this is done using filter banks. The control signals are sent to Control Circuits 45, and the TX line signal is sent to LF Hybrid 47, which interfaces the TX line signal and the RX line signal to the Line Interface 50. The Control Circuits 45 change the characteristics of the Line Interface 50 based on the control signals. The Line Interface 50 is connected to the telephone network.

Now, the RX signal path in FIG. 3 will be described. The analog RX line signal from the telephone network enters the Line Interface 50. From there, it is sent to the LF Hybrid 47, where it is separated from the TX line signal. The RX line signal is then sent to the MUX 48. The Status Signal Generator 49 sends status signals in analog form to the MUX 48. These signals are generated based on conditions in the Line Interface 50. MUX 48 combines the two analog signals into one base band signal. The combined signal is sent to the Modulator 44, which shifts the combined signal to a higher frequency, resulting in a pass band signal. The frequency of the Modulator 44 is locked to the frequency of the Demodulator 43. The pass band signal enters the High Frequency Hybrid 42, which interfaces both the pass band TX and pass band RX analog signals to the High Frequency Transformer 39. On the system side of the transformer, the pass band RX signal passes through a second High Frequency Hybrid 38. The pass band RX signal is then passed to the Demodulator 37, which shifts the frequency of the signal back to the base band. The base band signal is sent to the De-MUX 34, which separates the status signals from the RX line signal. The status signals are sent to the Status Circuits 35, which convert the signals into digital indications for the modem system. For example, these digital indications could be in the form of a ring indication, or bits in a status register. The RX line signal is sent to CODEC 33, which converts it into a digital signal for the modem system.

The operation of the DAA illustrated in FIG. 4 is very similar to that of FIG. 3. In this case, there are two HF transformers, one for the TX signal path and one for the RX signal path. Because of this separation, no High Frequency Hybrid circuits are required.

Figure 6:
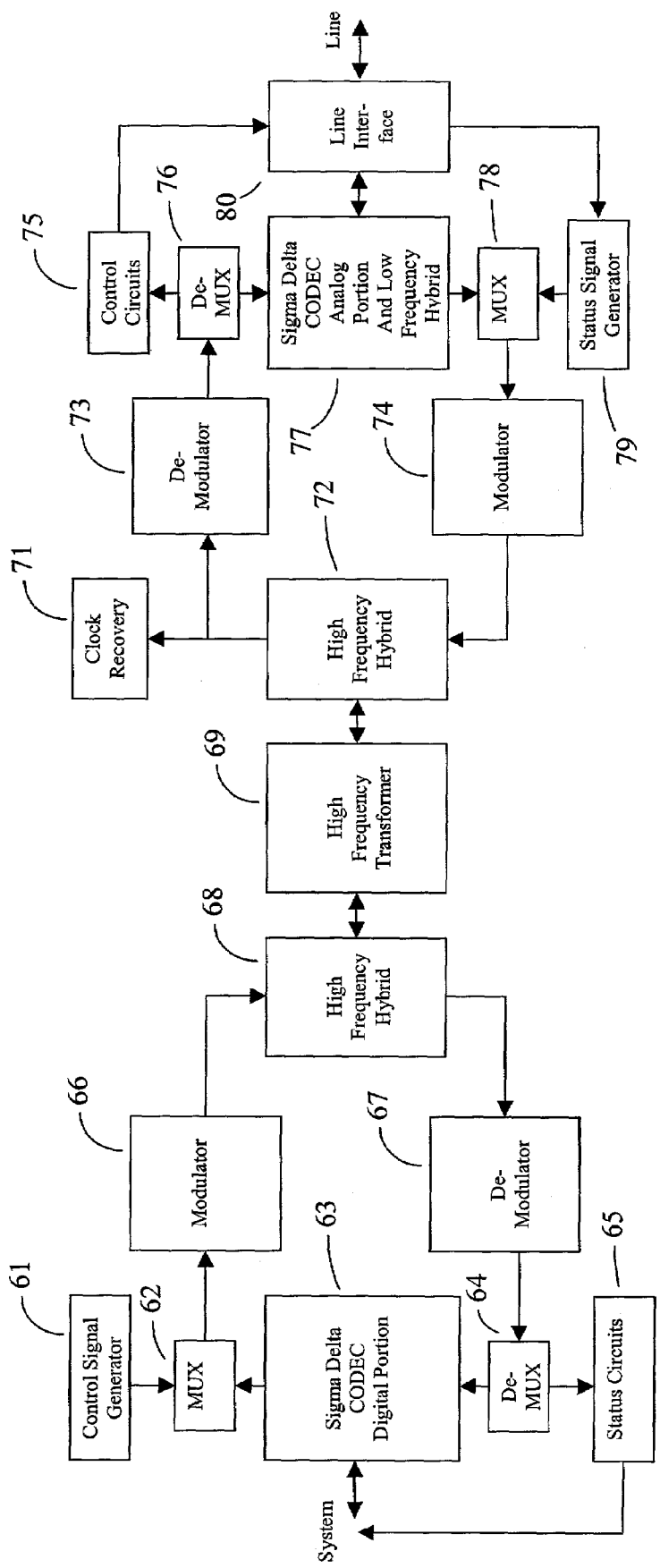
FIG. 6 illustrates a DAA using a single HF transformer isolation barrier and hybrid circuits to convert four-wire circuits to two-wire circuits, where the CODEC is distributed between the line side and the system side circuitry.
Figure 7:
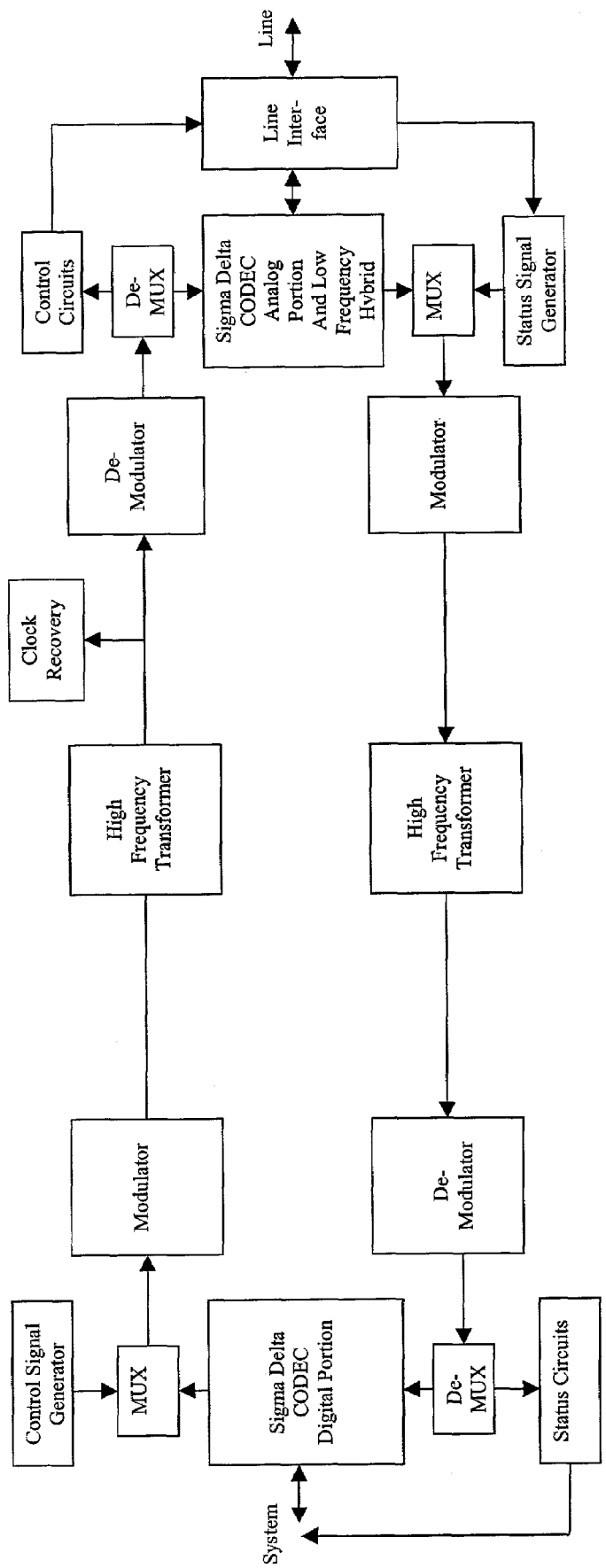
FIG. 7 illustrates a DAA using two HF transformer isolation barriers, one for TX and one for RX, where the CODEC is distributed between the line side and the system side circuitry.

FIGS. 6 and 7 illustrate the use of the invention in a DAA application where the CODEC circuitry is distributed between the line-side and the system-side. The analog portion of the circuitry is located on the line-side, and the digital portion is located on the system-side. First, the TX signal path in FIG. 6 will be described. Modem signals to be transmitted on the line are sent in digital form to Sigma Delta CODEC Digital Portion 63, which converts them to over-sampled 1-bit digital form and sends them to MUX 62. The Control Signal Generator 61 sends control signals in digital form to MUX 62. MUX 62 combines the two digital signals into one digital signal. MUX 62 includes framing circuitry to facilitate synchronization in the line-side circuitry. In a preferred embodiment, the resulting digital signal is twice the bit rate of the oversampled 1-bit digital signal from the Sigma Delta CODEC Digital Portion 63. The combined digital signal is sent to the Modulator 66, which uses it to modulate a high-frequency analog signal, resulting in a pass band signal. This could be accomplished, for example, by multiplying the digital signal by an analog clock signal. The resulting signal enters the High Frequency Hybrid 68, which interfaces both the pass band TX and pass band RX signals to the High Frequency Transformer 69. On the line side of the transformer, the pass band TX signal passes through a second High Frequency Hybrid 72. The pass band TX signal is then sent to both the Clock Recovery 71, and the Demodulator 73. The Clock Recovery 71 locks the frequency of the line-side Demodulator 73 to that of the system-side Modulator 66. The Demodulator 73 recovers the bits of the combined digital signal. These bits are sent to the De-MUX 76, which separates the digital control signals from the oversampled 1-bit digital TX line signal. De-MUX 76 includes a frame detection means to correctly align the data. The digital control signals are sent to Control Circuits 75, and the oversampled 1-bit digital TX line signal is sent to the Sigma Delta CODEC Analog Portion and LF Hybrid 77, which converts the 1-bit oversampled digital signal to analog form, and interfaces the TX line signal and the RX line signal to the Line Interface 80. The Control Circuits 75 change the characteristics of the Line Interface 80 based on the control signals. The Line Interface 80 is connected to the telephone network.

Now, the RX signal path in FIG. 6 will be described. The analog RX line signal from the telephone network enters the Line Interface 80. From there, it is sent to the Sigma Delta CODEC Analog Portion and LF Hybrid 77, where it is separated from the TX line signal and converted to an oversampled 1-bit digital form. The oversampled 1-bit digital signal is then sent to the MUX 78. The Status Signal Generator 79 sends digital status signals to the MUX 78. These signals are generated based on conditions in the Line Interface 80. MUX 78 combines the two digital signals into one digital signal. MUX 78 includes framing circuitry to facilitate synchronization in the system-side circuitry. The combined signal is sent to the Modulator 74, which uses the digital signal to modulate a high-frequency analog signal, resulting in a pass band signal. The frequency of the Modulator 74 is locked to the frequency of the Demodulator 73. The pass band signal enters the High Frequency Hybrid 72, which interfaces both the pass band TX and pass band RX to the High Frequency Transformer 69. On the system side of the transformer, the pass band RX signal passes through a second High Frequency Hybrid 68. The pass band RX signal is then passed to the Demodulator 67, which recovers the bits of the combined digital signal. The digital signal is sent to the De-MUX 64, which separates the status bits from the oversampled 1-bit digital RX line signal. De-MUX 76 includes a frame detection means to correctly align the data. The status signals are sent to the Status Circuits 65, which convert the signals into digital indications for the modem system. For example, these digital indications could be in the form of a ring indication or bits in a status register. The oversampled 1-bit digital RX line signal is sent to Sigma Delta CODEC Digital Portion 63, which converts it into a digital signal for the modem system.

The operation of the DAA illustrated in FIG. 7 is very similar to that of FIG. 6. In this case, there are two HF transformers, one for the TX signal path and one for the RX signal path. Because of this separation, no High Frequency Hybrid circuits are required.

Logical Circuits for Control

Many integrated DAA's use integrated control signals for hook control, line impedance control, and the like. The state of these integrated control signals is normally programmed by the system side circuitry into and remembered by the line side circuitry. However, since the line side circuitry is normally powered by the line voltage, disruption of the line voltage, such as in the event of a line voltage reversal, may corrupt the state of the control signals. Conventional ways to protect against such corruption are either freezing the control signal state during such disruption, or providing power at least partially from the system side. In the current invention, a novel approach is used that remembers the control state information on the system side and frequently updates the control signals on the line side. This way, the line side circuitry just follows the control information on the system side, therefore logically forms separate control circuits. The line side circuitry only keeps the control state until the next update. The time between updates, which may be variable, is typically on the order of microseconds. During a disruption, the control state may be temporarily corrupted on the line side. However, subsequent updates will restore the control signals to the correct states. In the event the update stops, such as if the system side suddenly powers down, the line side circuitry will restore its control signals to a default state. This will prevent one drawback to the programmable schemes, where the line side circuitry remains in a wrong state when a disruption happens in the system side.

Multiplexing of Control/Status Signals with Line Signals

In order to reduce the number of HF transformer isolation barriers in a DAA using our invention, preferred embodiments use multiplexing schemes to combine the TX and RX line signals with control and/or status signals. Typically, control signals are multiplexed with the TX line signal, and status signals are multiplexed with the RX line signal. In control information. One framing method that can be used is to group the status/control information into N sets of n bits. For framing, each set of n bits is preceded by a 0, and the N sets are preceded by (n+1) 1's. The synchronization mechanism can look for (n+1) 1's followed by a 0 to detect the frame. This pattern can only occur for one alignment of the frame; there is no chance for the status/control information to mimic this pattern. It is possible for the 1-bit digital signals to mimic the pattern, but due to the random nature of those signals, the subsequent frames will not mimic the same pattern. Only the true frame sync bits will consistently match the pattern. The framing efficiency of this scheme can be calculated as $n*N/[(n+1)*(N+1)]$.

To illustrate the multiplexing and framing concepts, consider that the frames are based on 32 bits. We choose n=3 and N=3, so the frame consists of 16 bits digital signal, 7 bits framing, and 9 bits status/control. The resulting bit stream can look like this:

| Bit  | 00    | 01 | 02    | 03 | 04    | 05 | 06    | 07 | 08    | 09 | 10    | 11 | 12    | 13 | 14    | 15 |
|------|-------|----|-------|----|-------|----|-------|----|-------|----|-------|----|-------|----|-------|----|
| data | $F_0$ | DD | $F_1$ | DD | $F_2$ | DD | $F_3$ | DD | $F_4$ | DD | $S_0$ | DD | $S_1$ | DD | $S_2$ | DD |
| Bit  | 16    | 17 | 18    | 19 | 20    | 21 | 22    | 23 | 24    | 25 | 26    | 27 | 28    | 29 | 30    | 31 |
| data | $F_5$ | DD | $S_3$ | DD | $S_4$ | DD | $S_5$ | DD | $F_6$ | DD | $S_6$ | DD | $S_7$ | DD | $S_8$ | DD |

DD = 1-bit digital data stream
$[F_0 F_1 F_2 F_3 F_4 F_5 F_6]$ = 1111000
$S_n$ = nth status/control bit DAA's such as those illustrated in FIGS. 3 and 4, an analog multiplexing scheme is used, typically a simple summing of signals with different frequency content. The demultiplexing is accomplished using filter banks. In the case of FIG. 3 where a single HF transformer is used with HF hybrid circuits, different frequencies are used for control and status, so that the echo from one side does not cause confusion for the other side.

In DAA's such as those illustrated in FIGS. 6 and 7, a digital multiplexing scheme is used by preferred embodiments. The digital multiplexing scheme can provide two functions: 1) a mechanism for framing and 2) a mechanism for Sigma Delta clock-recovery. In order to simplify clock-recovery, we force the bit rate of the multiplexed data to be an integer multiple of the Sigma Delta clock rate. In a preferred embodiment, the multiplexed bit rate is double the Sigma Delta bit rate. This means that half of the bits in the multiplexed data stream are available for control/status and framing. A simple way to assign the bits is to let every other bit be used for the digital signal, and assign the other bits for framing and control/status.

The 1-bit digital signals are assumed to be randomly distributed 1's and 0's, with no framing required. Therefore, the framing bits are only needed to synchronize the status/

For embodiments of the invention according to FIG. 6, it is desirable to have a different frame sync pattern for the TX and RX directions, chosen such that it is not possible for either pattern to occur in an echo signal. Since the High Frequency Hybrid circuits combine the TX and RX signals, the Demodulators 67 and 73 will see an echo of the signals from Modulators 66 and 74, respectively. The hybrid circuits reduce the echo levels, but cannot remove the echo completely. For example, in FIG. 6, De-MUX 64 should not have the possibility of locking to the combined digital signal from MUX 62; it should only be able to lock to the combined digital signal from MUX 78. It is also desirable to choose frame sync patterns such that the binary inverse of one direction's sync pattern cannot occur in the other direction. This is because the polarity of the echo signal is uncertain. There are many possible pairs of frame sync patterns that meet these requirements. One example is illustrated below:

| Bit  | 00 | 01 | 02 | 03 | 04 | 05 | 06 | 07 | 08 | 09 | 10 | 11 | 12 | 13 | 14 | 15 |
|------|----|----|----|----|----|----|----|----|----|----|----|----|----|----|----|----|
| data | F0 | DD | F1 | DD | S0 | DD | S1 | DD | S2 | DD | S3 | DD | S4 | DD | F2 | DD |
| Bit  | 16 | 17 | 18 | 19 | 20 | 21 | 22 | 23 | 24 | 25 | 26 | 27 | 28 | 29 | 30 | 31 |
| data | F3 | DD | S5 | DD | S6 | DD | F4 | DD | S7 | DD | F5 | DD | S8 | DD | F6 | DD |

DD = 1-bit digital data stream
For one direction, [F0 F1 F2 F3 F4 F5 F6] = 0 0 0 0 0 1 1
For other direction, [F0 F1 F2 F3 F4 F5 F6] = 0 1 0 0 0 1 1
Sn = nth status/control bit For these frame sync patterns, the synchronization mechanism must check all 7 frame bits for their correct alignment within the 32-bit frame.

Figure 9:
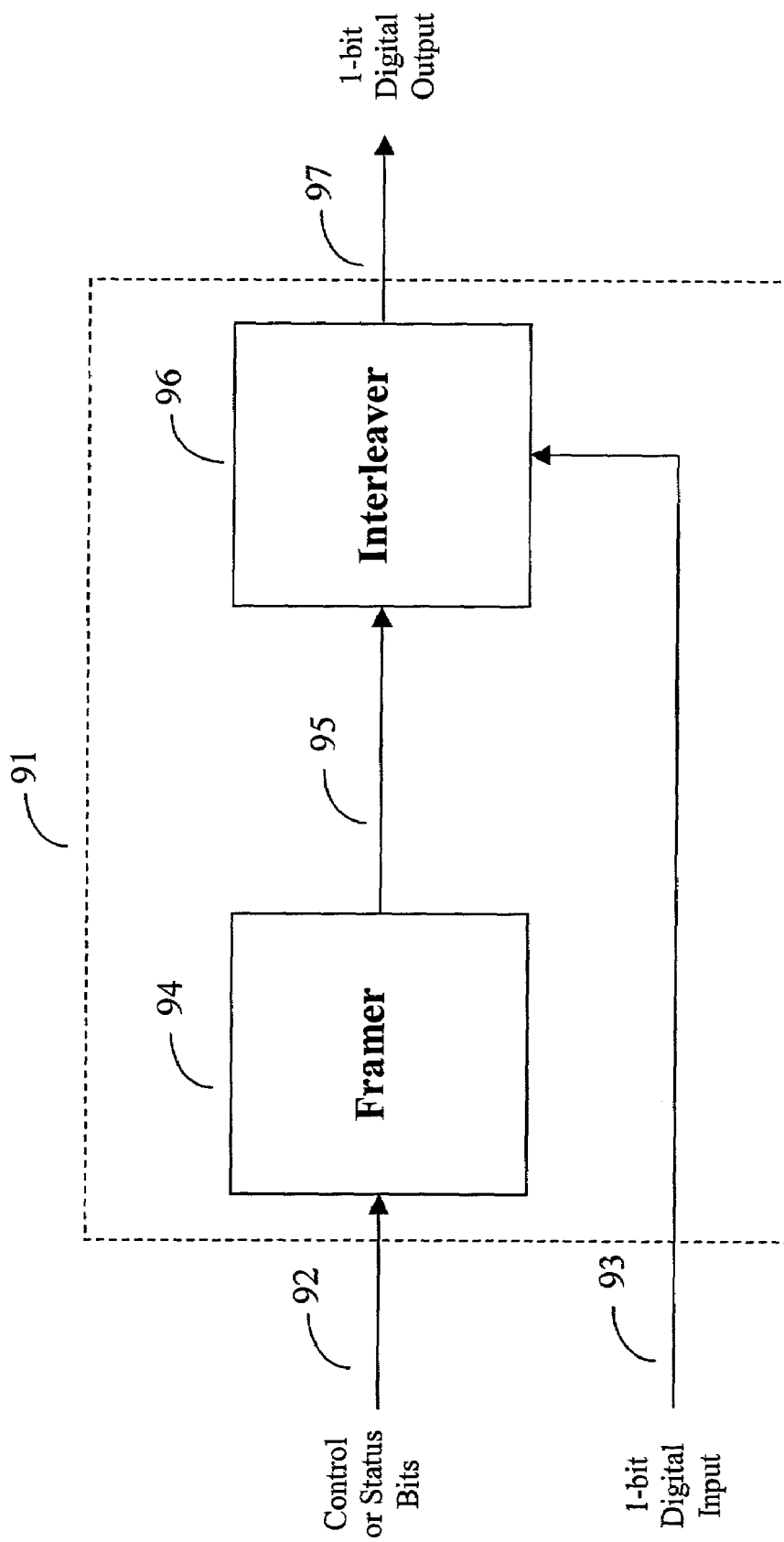
FIG. 9 illustrates a multiplexor useful in our invention.

The digital multiplexing scheme described above can be further understood by reference to FIG. 9. In this figure, a multiplexor 91 has two inputs: one for control or status bits 92, and one for a 1-bit digital signal 93. A first number of control or status bits enters the framer 94, which combines them with a fixed framing pattern having a second number of bits to from framer output 95. The framing pattern is chosen such that it uniquely indicates the correct framing alignment position of the framing output bits for all combinations of the status or control bits. The framer output 95 and the 1-bit digital signal 93 enter the interleaver 96. The interleaver 96 takes a third number of bits from the framer output 95, where the third number is equal to the sum of the first and second numbers. The interleaver 96 interleaves the third number of bits with a proportional number of bits taken from the 1-bit digital input 93, to form a 1-bit digital output 97 having a fourth number of bits.

In a preferred embodiment, a DAA such as that illustrated in FIG. 6 uses two multiplexors, each functioning as illustrated in FIG. 9. It will be appreciated by those skilled in the art that the HF hybrid circuits in such a DAA will cause an echo of the modulator outputs to be seen by the demodulators on the same side of the HF transformer. In normal operation, the signal from the modulator on the other side of the HF transformer is stronger than the echo signal from the modulator on the same side of the HF transformer, so the demodulator decodes the correct bits. However, if the circuit on the other side of the HF transformer is not powered, the demodulator will only see the echo signal from the modulator on the same side of the HF transformer. In this case, it is possible for the demultiplexor to see the bits from the multiplexor on the same side of the HF transformer instead of the desired bits from the other side. For this reason, a preferred embodiment uses a different framing pattern for each multiplexor, such that each side's framing pattern prevents the multiplexor output from producing the other side's framing pattern for any combination of control or status bits. In addition, since the echo signal may be inverted, each framing pattern prevents the multiplexor output from producing the logical inverse of the other side's framing pattern.

Hybrid Circuits

Figure 5:
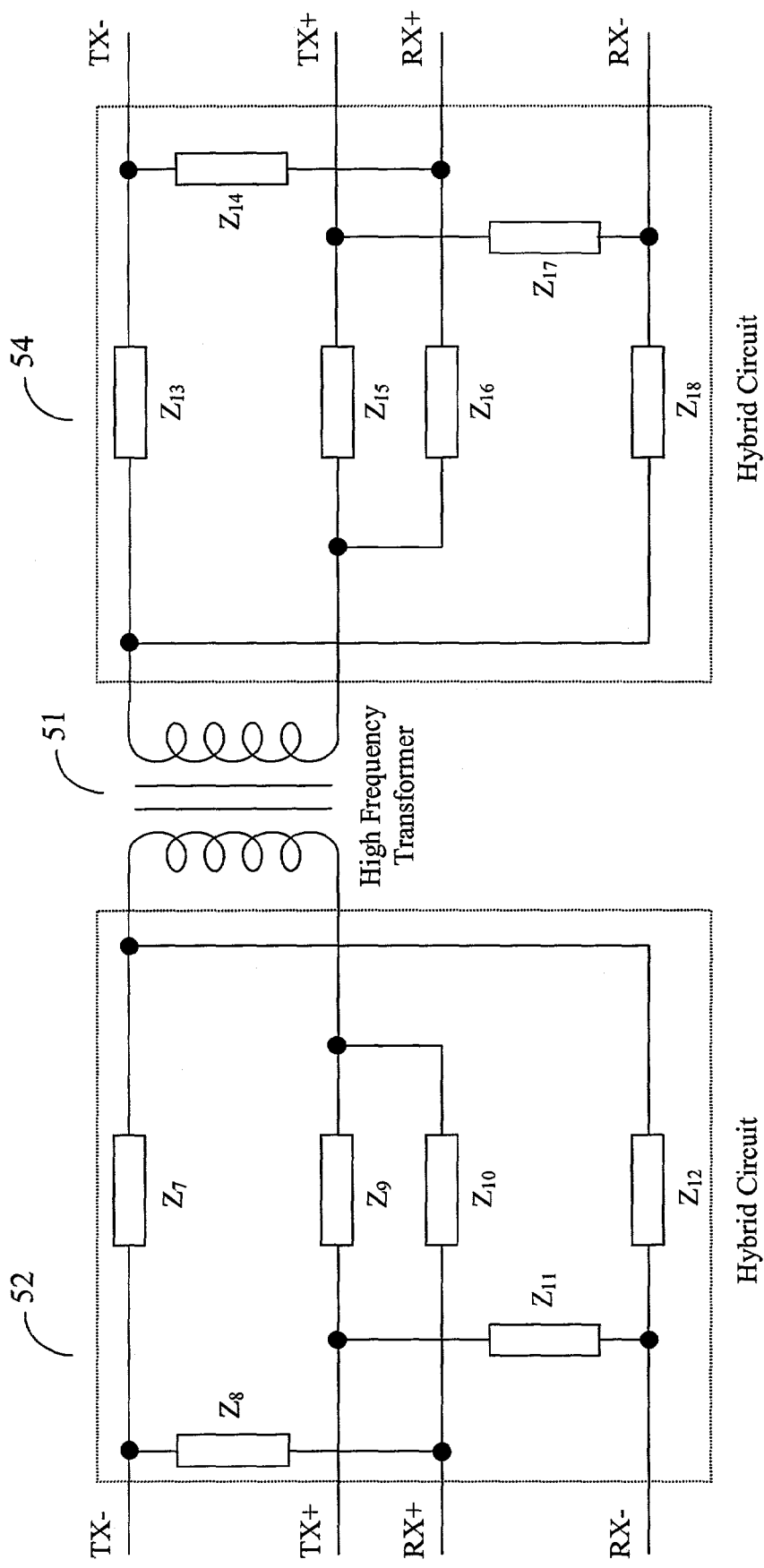
FIG. 5 illustrates a connection between a single HF transformer and two hybrid circuits useful in FIG. 3 or FIG. 6.

High frequency hybrid circuits that can be used in FIGS. 3 and 6 are illustrated in FIG. 5. FIG. 5 shows two high frequency hybrid circuits 52 and 54, one on either side of a HF transformer 51. The hybrid circuit architecture is identical to that used for low-frequency hybrids in traditional voice band transformer based DA's, as illustrated in FIG. 1. The main difference is that the values of the impedance elements Z7-Z12 and Z13-Z18 used in the high frequency hybrids will generally differ from the values of impedance elements Z1-Z6 used in the low frequency hybrid. The design of hybrid circuits is well known in the art.

Power for Line Side Circuitry

In a preferred embodiment, the line side circuitry derives its power entirely from the telephone network. However, our invention can also be used in configurations where the line side does not have a power supply such as the case of ADSL DM, or the power supply is simply insufficient. In these cases, a supplementary power supply can be added to provide power to the line side circuitry. For example, power may be supplied from the system side to the line side using the circuit illustrated in FIG. 8. In this circuit, a clock/power signal generator 81 on the system side generates a periodic power signal on lines 82, which are connected to a transformer 83. On the line side, the output signal of the transformer on line 84 may be capacitively coupled to the clock input of the modulator and/or demodulator. The output signal of the transformer is further conditioned by a half-wave rectifier circuit, consisting of a diode 85 and a capacitor 86, to provide a stable power supply on output lines 87, which can be connected to power (Vcc) and ground (GND) inputs of the line side circuit. Power supply circuits such as illustrated in FIG. 8 are well known in the art.

While the foregoing has been with reference to particular embodiments of the invention, it will be appreciated by those skilled in the art that changes in these embodiments may be made without departing from the principles and spirit of the invention, the scope of which is defined by the appended claims.

We claim:

1. An electrical isolation barrier for use in a data access arrangement for providing electrical isolation between a system side circuit and a line side circuit, comprising, in combination:
   an HF transformer having a desired frequency range of operation, and having a first port and a second port;
   a first modulator coupled to first port of said HF transformer, said first modulator modulating a first 1-bit digital signal to a first analog pass band signal within said desired frequency range and transmitting the modulated signal to said HF transformer;
   a first demodulator coupled to said first second port of said HF transformer, said demodulator demodulating said first analog pass band signal to recover said first 1-bit digital signal for transmission to said line side circuit;
   wherein said first modulator is coupled to said HF transformer through a first HF hybrid circuit and said HF transformer is coupled to said first demodulator through a second HF hybrid circuit;
   a second modulator coupled to said second port of said HF transformer through said second HF hybrid circuit, said second modulator modulating a second 1-bit digital signal to a second analog pass band signal within said desired frequency range and transmitting it to said HF transformer;
   a second demodulator coupled to said first port of said HF transformer through said first HF hybrid circuit, said second demodulator demodulating said second analog pass band signal to recover said second 1-bit digital signal for transmission to said system side circuit; and
   wherein the line side circuit includes an analog portion of a sigma-delta codec, said analog portion converting an analog receive signal to a third 1-bit digital signal; and
   wherein the line side circuit includes a second multiplexor connected to said second modulator, receiving digital status signals and said third 1-bit digital signal, said multiplexor combining said digital status signals and said third 1-bit digital signal to form said second 1-bit digital signal.

2. The electrical isolation barrier of claim 1 wherein the second multiplexor includes a second frame generation circuit to align the digital status signals.

3. The electrical isolation barrier of claim 1 wherein the system side circuit includes (1) a second demultiplexor connected to a second demodulator, said second demultiplexor recovering said digital status signals and said fourth 1-bit digital signal from the recovered third 1-bit digital signal, and (2) a digital portion of a sigma-delta codec to convert said fourth 1-bit digital signal to digital modem signals.

4. The electrical isolation barrier of claim 3 wherein the second demultiplexor includes a second frame detection circuit to detect the alignment of the digital status signals.

5. An electrical isolation barrier for use in a data access arrangement for providing electrical isolation between a system side circuit and a line side circuit, comprising, in combination:
- an HF transformer having a desired frequency range of operation, and having a first port and a second port;
- a first modulator coupled to first port of said transformer through a first HF hybrid circuit, said first modulator modulating a first 1-bit digital signal to a first analog pass band signal within said desired frequency range and transmitting the modulated signal to said transformer;
- a first demodulator coupled to said second port of said transformer through a second HF hybrid circuit, said demodulator demodulating said first pass band signal to recover said first 1-bit digital signal for transmission to said line side circuit;
- a second modulator coupled to said second port of said transformer through said second HF hybrid circuit, said second modulator modulating a third 1-bit digital signal to a second analog pass band signal within said desired frequency range and transmitting it to said transformer;
- a second demodulator coupled to said first port of said transformer through said first HF hybrid circuit, said second demodulator demodulating said second pass band signal to recover said third 1-bit digital signal for transmission to said system side circuit;
- a digital portion of a sigma-delta codec included in said system side circuit for converting digital modem signals to a second 1-bit digital signal and converting a fourth 1-bit digital signal to digital modem signals;
- a first multiplexor included in the system side circuit and connected to said first modulator, said first multiplexor receiving digital control signals and said second 1-bit digital signal and multiplexing them to form said first 1-bit digital signal;
- a first demultiplexor included in the line side circuit and connected to the first demodulator, said first demultiplexor separating the digital control signals and second 1-bit digital signal from the recovered first 1-bit digital signal;
- an analog portion of a sigma-delta codec included in the line side circuit, said analog portion converting an analog receive signal to a fourth 1-bit digital signal and converting a second 1-bit digital signal to an analog transmit signal;
- a second multiplexor included in the line side circuit and connected to said second modulator, said second multiplexor receiving digital status signals and said fourth 1-bit digital signal and combining them to form said third 1-bit digital signal;
- a second demultiplexor included in the system side circuit and connected to the second demodulator, said second demultiplexor recovering said digital status signals and said fourth 1-bit digital signal from the recovered third 1-bit digital signal.

6. The electrical isolation barrier of claim 5 wherein
- the first multiplexor includes a first frame generation circuit to align the digital control signals;
- the first demultiplexor includes a first frame detection circuit to detect the alignment of the digital control signals;
- the second multiplexor includes a second frame generation circuit to align the digital status signals; and
- the second demultiplexor includes a second frame detection circuit to detect the alignment of the digital status signals.

7. An electrical isolation barrier for use in a data access arrangement, comprising, in combination:
- an input circuit and an output circuit;
- an HF transformer for providing electrical isolation between the input circuit and the output circuit and having a frequency range of desired operation, said transformer having two ports;
- a modulator and high frequency circuit combination capable of bidirectional operation and having an input and an output,
  - said modulator input capable of being connected to the input circuit, said modulator shifting an input signal to a bandpass signal within the frequency range of the transformer, such that integer multiples of two or greater of frequencies of the shifted input signal fall outside of the frequency range of the transformer;
  - said modulator output coupled to the first port of the transformer to supply said shifted signals to the transformer;
- a demodulator and high frequency circuit combination capable of bidirectional operation having an input and an output,
  - said demodulator input coupled to the second port of the transformer, said demodulator shifting said bandpass signals from the frequency range of the transformer to an output signal for use by the output circuit.

8. The electrical isolation barrier of claim 7 wherein:
- the modulator includes a multiplier, said multiplier being connected to a clock for multiplying the input signal by a clock signal;
- the demodulator includes a multiplier, said multiplier connected to a clock for multiplying the output of the transformer by said clock signal; and
- the demodulator includes a low pass filter to remove distortion from the output signal.

9. The electrical isolation barrier of claim 7 wherein:
- the input signal to the modulator is a first 1-bit digital signal;
- the modulator converts said first 1-bit digital signal to an input signal having frequencies in the frequency range of the transformer;
- the demodulator converts signals having frequencies in the frequency range of the transformer to recover the first 1-bit digital signal.

10. The electrical isolation barrier of claim 9 wherein at least some portion of the first 1-bit digital signal is generated using sigma-delta techniques.

11. The electrical isolation barrier of claim 9 wherein the input circuit includes a multiplexor to multiplex digital status or control signals with a second 1-bit digital signal to form the first 1-bit digital signal.

12. The electrical isolation barrier of claim 11 wherein the output circuit includes a demultiplexor to extract digital status or control signals and the second 1-bit digital signal from the first 1-bit digital signal.

13. The electrical isolation barrier of claim 12 wherein the second 1-bit digital signal is generated using sigma-delta techniques.

14. The electrical isolation barrier of claim 12 wherein the multiplexor includes a frame generation circuit to align the digital status or control signals.

15. The electrical isolation barrier of claim 12 wherein the demultiplexor includes a frame detection circuit to detect the alignment of the digital status or control signals.

16. The electrical isolation barrier of claim 7 further including a multiplexor to multiplex status or control signals with line signals for transmission over the electrical isolation barrier.

17. The electrical isolation barrier of claim 16 wherein the signal output from the demodulator includes status or control information.

18. The electrical isolation barrier of claim 16 wherein said status signals are of different frequencies from said control signals.

19. The method of providing an electrical isolation barrier in a modem system comprising the steps of:
   providing a single high frequency transformer in the data access arrangement section of the modem, which transformer has a predetermined frequency operation range and an input port and an output port, and is capable of duplex operation;
      shifting an input signal to a passband within the frequency operation range of the transformer such that integer multiples of two or greater of frequencies of the shifted signal fall outside of the frequency range of the transformer, and providing the shifted signal to the transformer input port;
      obtaining from the output port of the transformer an output signal; and
      shifting the output signal to recover the input signal.

20. The method of claim 19 wherein the input signal is a 1-bit digital signal; and
   the step of modulating the input signal includes multiplying a clock signal with the 1-bit digital signal to form a high-frequency signal; and
   the step of demodulating the output signal to recover the input signal includes demodulating the high frequency signal by clock multiplication.

21. The method of claim 20 wherein at least some of the bits in the 1-bit digital signal are obtained using sigma-delta techniques.

22. The method of claim 19 further including providing a half-wave rectifier circuit to derive power from said modulated first signal.

23. An electrical isolation barrier for use in a data access arrangement for providing electrical isolation between a line side circuit and a system side circuit, comprising, in combination:
   a first pair of input and output circuits for a TX signal and a second pair of input and output circuits for an RX signal, wherein the first input circuit and the second output circuit are located in the line side circuit, and the second input circuit and the first output circuit are located in the system side circuit;
   a first HF transformer for providing electrical isolation between the first pair of input and output circuits and having a frequency range of desired operation, said first transformer having two ports;
   a first modulator having an input and an output,
      said first modulator input capable of being connected to the input circuit of the first pair of input and output circuits and modulating an input signal to frequencies within the frequency range of the first transformer such that integer multiples of two or greater of frequencies of the shifted signal fall outside of the frequency range of the transformer;
      said first modulator output connected to the first port of the first transformer to supply the modulated signals to the first transformer;
   a first demodulator having an input and an output,
      said first demodulator input connected to the second port of the first transformer for demodulating signals from the frequency range of the first transformer to an output signal for use by the output circuit of the first pair of input and output circuits;
   a second HF transformer for providing electrical isolation between the second pair of input and output circuits and having a frequency range of desired operation, said second transformer having two ports;
   a second modulator having an input and an output,
      said second modulator input capable of being connected to the input circuit of the second pair of input and output circuits and modulating the input signal to frequencies within the frequency range of the second transformer;
      said second modulator output connected to the first port of the second transformer to supply the modulated signals to the second transformer;
   a second demodulator having an input and an output,
      said second demodulator input connected to the second port of the second transformer for demodulating signals from the frequency range of the second transformer to an output signal for use by the output circuit of the second pair of input and output circuits.

24. An electrical isolation barrier for use in a data access arrangement for providing electrical isolation between a system side circuit and a line side circuit, comprising, in combination:
   an HF transformer having a desired frequency range of operation, and having a first port and a second port;
   a first modulator coupled to the first port of said transformer through a first HF circuit, said first modulator modulating a first base band signal to a first pass band signal within said desired frequency range such that integer multiples of two or greater of frequencies of the first pass band signal fall outside of the disired frequency range of the HF transformer, and transmitting the first pass band signal to said HF transformer;
   a first demodulator coupled to said second port of said transformer through a second HF circuit, said demodulator demodulating said first pass band signal to recover said first base band signal for transmission to said line side circuit.

25. The electrical isolation barrier of claim 24 wherein said first modulator is coupled to said transformer through a first HF circuit and said transformer is coupled to said first demodulator through a second HF circuit.

26. The electrical isolation barrier of claim 24, wherein the system side circuit includes (1) a codec for converting digital modem signals to a transmit signal, and (2) a first multiplexor connected to said first modulator, said first multiplexor receiving control signals and said transmit signal and multiplexing said control signals and said transmit signal to form said first base band signal.

27. The electrical isolation barrier of claim 26 wherein the line side circuit includes a first demultiplexor connected to first demodulator, said demodulator shifting the frequency of said first pass band signal back to the original base band and said first demultiplexor separating the said control signals from the said transmit signal.

28. The electrical isolation barrier of claim 24 including a clock recovery circuit connected to said second HF circuit for locking the frequency of said first demodulator to that of said first modulator.

29. The electrical isolation barrier of claim 24 wherein the line side circuit includes a LF circuit coupled to a communications line for receiving receive signals and transmitting transmit signals.

30. The electrical isolation barrier of claim 24 including
a second modulator coupled to said second port of said transformer through said second HF circuit, said second modulator modulating a second base band signal to a second pass band signal within said desired frequency range and transmitting it to said transformer;
a second demodulator coupled to said first port of said transformer through said first HF circuit, said second demodulator demodulating said second pass band signal to recover said second base band signal for transmission to said system side circuit.

31. The electrical isolation barrier of claim 30, wherein the line side circuit includes a second multiplexor connected to said second modulator, receiving status signals and a receive signal, said multiplexor combining said status signals and said receive signal to form said second base band signal.

32. The electrical isolation barrier of claim 31 wherein the system side circuit includes (1) a codec for converting a receive signal to digital modem signals and (2) a second demultiplexor connected to second demodulator, said demodulator shifting the frequency of said second pass band signal back to the original base band and said second demultiplexor separating said status signals from said receive signal.

33. An electrical isolation barrier for use in a data access arrangement for providing electrical isolation between a system side circuit and a line side circuit, comprising, in combination:
an HF transformer having a desired frequency range of operation, and having a first port and a second port;
a first modulator coupled to first port of said transformer, said first modulator modulating a first 1-bit digital signal to a first pass band signal within said desired frequency range such that integer multiples of two or greater of frequencies of the shifted signal fall outside of the frequency range of the transformer, and transmitting the modulated first pass band signal to said HF transformer;
a first demodulator coupled to said second port of said transformer, said demodulator demodulating said first pass band signal to recover said first 1-bit digital signal for transmission to said line side circuit.

34. The electrical isolation barrier of claim 33 wherein said first modulator is coupled to said transformer through a first HF circuit and said transformer is coupled to said first demodulator through a second HF circuit.

35. The electrical isolation barrier of claim 34 including a clock recovery circuit connected to said second HF circuit for locking the frequency of said first demodulator to that of said first modulator.

36. The electrical isolation barrier of claim 34 including
a second modulator coupled to said second port of said transformer through said second HF circuit, said second modulator modulating a third 1-bit digital signal to a second pass band signal within said desired frequency range and transmitting it to said transformer;
a second demodulator coupled to said first port of said transformer through said first HF circuit, said second demodulator demodulating said second pass band signal to recover said third 1-bit digital signal for transmission to said system side circuit.

37. The electrical isolation barrier of claim 36, wherein the line side circuit includes a portion of a sigma-delta codec, said portion converting a receive signal to a fourth 1-bit digital signal.

38. The electrical isolation barrier of claim 37, wherein the line side circuit includes a second multiplexor connected to said second modulator, receiving digital status signals and said fourth 1-bit digital signal, said multiplexor combining said digital status signals and said fourth 1-bit digital signal to form said third 1-bit digital signal.

39. The electrical isolation barrier of claim 38 wherein the second multiplexor includes a second frame generation circuit to align the digital status signals.

40. The electrical isolation barrier of claim 38 wherein the system side circuit includes (1) a second demultiplexor connected to a second demodulator, said second demultiplexor recovering said digital status signals and said fourth 1-bit digital signal from the recovered third 1-bit digital signal, and (2) a digital portion of a sigma-delta codec to convert said fourth 1-bit digital signal to digital modem signals.

41. The electrical isolation barrier of claim 40 wherein the second demultiplexor includes a second frame detection circuit to detect the alignment of the digital status signals.

42. The electrical isolation barrier of claim 33, wherein the system side circuit includes (1) a digital portion of a sigma-delta codec for converting digital modem signals to a second 1-bit digital signal, and (2) a first multiplexor connected to said first modulator, said first multiplexor receiving digital control signals and said second 1-bit digital signal and multiplexing said digital control signals and second 1-bit digital signal to form said first 1-bit digital signal.

43. The electrical isolation barrier of claim 42 wherein the first multiplexor includes a first frame generation circuit to align the digital control signals.

44. The electrical isolation barrier of claim 42 wherein the lineside circuit includes a first demultiplexor connected to the first demodulator, said first demultiplexor separating the digital control signals and second 1-bit digital signal from the recovered first 1-bit digital signal.

45. The electrical isolation barrier of claim 44 wherein the first demultiplexor includes a frame detection circuit to detect the alignment of the digital control signals.

46. The electrical isolation barrier of claim 44, wherein the line side circuit includes a portion of a sigma-delta codec coupled to said first demodulator, said portion of sigma-delta codec converting the recovered second 1-bit digital signal into a transmit signal.

47. The electrical isolation barrier of claim 44 wherein the separation in the first multiplexor is accomplished using filter banks.

48. The electrical isolation barrier of claim 33 wherein the line side circuit includes a LF circuit coupled to a communications line for receiving receive signals and transmitting transmit signals.

49. The electrical isolation barrier of claim 33 further wherein said line side circuit includes a half-wave rectifier circuit to derive power from said pass band signal.

50. An electrical isolation barrier for use in a data access arrangement for providing electrical isolation between a system side circuit and a line side circuit, comprising, in combination:
an HF isolation element having a desired frequency range of operation, and having a first port and a second port;

a first modulator coupled to the first port of said isolation element through a first HF circuit, said first modulator modulating a first base band signal to a first pass band signal within said desired frequency range such that integer multiples of two or greater of frequencies of the first pass band signal fall outside of the frequency range, and transmitting the modulated signal to said isolation element;

a first demodulator coupled to said second port of said isolation element through a second HF circuit, said demodulator demodulating said first pass band signal to recover said first base band signal for transmission to said line side circuit;

a second modulator coupled to said second port of said isolation element through said second HF circuit, said second modulator modulating a second base band signal to a second pass band signal within said desired frequency range such that integer multiples of two or greater of frequencies of the shifted signal fall outside of the frequency range, and transmitting it to said isolation element;

a second demodulator coupled to said first port of said isolation element through said first HF circuit, said second demodulator demodulating said second pass band signal to recover said second base band signal for transmission to said system side circuit.

51. An electrical isolation barrier for use in a data access arrangement, comprising, in combination:

an HF transformer for providing electrical isolation between an input circuit and an output circuit and having a frequency range of desired operation, said transformer having a first port and a second port ports;

a modulator and high frequency circuit combination capable of bidirectional operation and having an input and an output, said modulator input capable of being connected to the input circuit, said modulator modulating the input signal to frequencies within the frequency range of the transformer such that integer multiples of two or greater of frequencies of the modulated input signal fall outside of the frequency range of the transformer;

said modulator output coupled to the first port of the transformer to supply the modulated signals to the transformer;

a demodulator and high frequency circuit combination capable of bidirectional operation having an input and an output, said demodulator input coupled to the second port of the transformer, said demodulator demodulating signals from the frequency range of the transformer to an output signal for use by the output circuit.

52. The electrical isolation barrier of claim 51 wherein:

the modulator includes a multiplier, said multiplier being connected to a clock for multiplying the input signal by a clock signal;

the demodulator includes a multiplier, said multiplier connected to a clock for multiplying the output of the transformer by said clock signal; and the demodulator includes a low pass filter to remove distortion from the output signal.

53. The method of providing an electrical isolation barrier in a modem system comprising the steps of:

providing a single high frequency transformer in the data access arrangement section of the modem, which transformer has a predetermined frequency operation range and an input port and an output port, and delivers both signal and power;

providing a power deriving circuit to derive power from a modulated signal;

shifting an input signal to a bandpass signal within the frequency operation range of the transformer such that integer multiples of two or greater of frequencies of the shifted signal fall outside of the frequency range of the transformer, and providing the shifted first signal to the transformer input port;

obtaining from the output port of the transformer an output signal;

utilizing said power deriving circuit to derive power from said first modulated shifted signal; and shifting the frequency of the output signal to recover the input signal.

* * * * *